United States Patent [19] [11] 3,983,984
de Kler [45] Oct. 5, 1976

[54] BALL AND GROOVE MOTION CONVERTING APPARATUS AND TYPEWRITER SELECTION APPARATUS EMBODYING SAME

[75] Inventor: Dirk de Kler, Loosdrecht, Netherlands

[73] Assignee: International Business Machines Corporation, Armonk, N.Y.

[22] Filed: June 26, 1975

[21] Appl. No.: 590,737

[52] U.S. Cl. .................................... 197/18; 74/57; 197/55

[51] Int. Cl.[2] ...................... B41J 1/60; B41J 23/14; F16H 25/14

[58] Field of Search ........ 74/57; 197/18, 49, 52–55; 178/34

[56] References Cited

UNITED STATES PATENTS

| | | | |
|---|---|---|---|
| 2,502,761 | 4/1950 | Stachowiak et al. | 74/57 |
| 2,539,921 | 1/1951 | Neisingh | 74/57 |
| 3,625,331 | 12/1971 | Waldenburger et al. | 197/18 |
| 3,696,682 | 10/1972 | Matas | 74/57 |
| 3,885,662 | 5/1975 | Schaefer | 197/52 |
| 3,892,304 | 7/1975 | Sakib | 197/18 |

*Primary Examiner*—Edgar S. Burr
*Assistant Examiner*—Paul T. Sewell
*Attorney, Agent, or Firm*—Laurence R. Letson

[57] ABSTRACT

A selection mechanism is disclosed which greatly simplifies the selection controls for a single element typewriter and thereby adapts it for inexpensive manufacture and reliable operation. A single continuous groove in the cylindrical periphery of a rotating shaft provides a universal surface similar to a cam surface to translate a follower member in a coaxial direction with respect to the rotating shaft and thus provide a linear movement which may be controlled in displacement and thus provide a defined or controlled input which in turn may be converted to a rotary motion for the typehead. The follower block is prevented from traversing any further than that distance which is desired and the follower is relieved by a spring bias member to allow it to ride out of the groove and thus allow the follower block to only traverse as far as permitted for a particular character selection.

5 Claims, 3 Drawing Figures

BALL AND GROOVE MOTION CONVERTING APPARATUS AND TYPEWRITER SELECTION APPARATUS EMBODYING SAME

BACKGROUND OF THE INVENTION

The invention relates to a rotary to linear motion convertor and more particularly to a device for converting rotary motion to a measured linear displacement for ultimate conversion into the required rotation of a typehead on a single element typewriter or printer.

Single element typewriters have been known in the art for a long period of time and have been commercially available in the form of the IBM "Selectric" typewriter since the early 1960's. That typewriter is such that it requires a substantial amount of mechanical linkage and mechanisms to take the motion and information created from the keyboard and convert it into displacement of selection tapes which in turn control the movement of the typehead with respect to the carrier.

Further, the typewriter has required a substantial amount of critical adjustment and criticality of manufacturing dimensions.

With these factors in mind, efforts have been made to simplify and improve selection mechanism in single element typewriters.

OBJECT OF THE INVENTION

It is therefore an object of the invention to eliminate critical manufacturing problems through the elimination of parts and subassemblies and the simplification of the selection mechanism.

It is a further object of the invention to convert rotary motion to linear motion of a plurality of different selectable displacements using a single continuous groove as the input force generating means.

The foregoing and other objects of the invention will be more readily apparent and understood by referring to the drawings and description contained herein.

DRAWINGS

DETAILED DESCRIPTION

Figure 2:
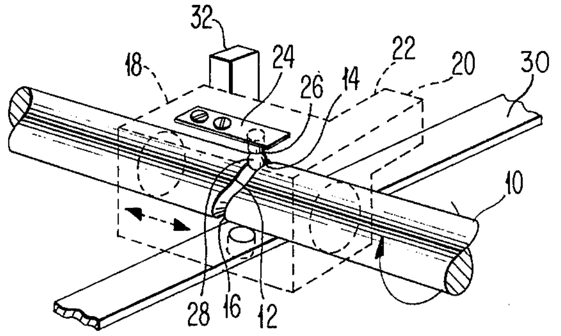
FIG. 2 illustrates the rotary to linear motion conversion device and the relationship between the groove formed in the periphery of said rotating shaft, the follower and spring bias restraining means together with the follower block.

Referring to FIG. 2, rotatable shaft 10 is illustrated as having a groove 12 formed in its periphery. Groove 12 is such that it is closed upon itself and forms a continuous camming groove or camming surface.

The groove will have a low rise 14 as illustrated in FIG. 2. On the opposite side of the shaft, the groove will have a high rise 16. The high rise will be the point of maximum displacement in the leftward direction upon one half revolution of shaft 10.

The camming groove 12 or surface between low rise 14 and high rise 16 may be of any desired configuration but by way of example may approximate a helix, but is designed to provide constant velocity for the follower after initial acceleration.

The configuration of the portion of groove 12 between low rise 14 and high rise 16 is not critical and may vary depending upon the forces generated by the device.

Surrounding shaft 10 and indicated in phantom lines is a follower block 18. Follower block 18 may take any desired shape but for the purposes of this disclosure is illustrated with a stop arm 20 which has a stop surface 22. Further, follower 18 is provided with a leaf spring 24 which acts upon a follower rod 26 which in turn urges a small ball 28 into the groove 12 on shaft 10. Leaf spring 24 provides a spring relief for the movement of ball 28.

Figure 1:
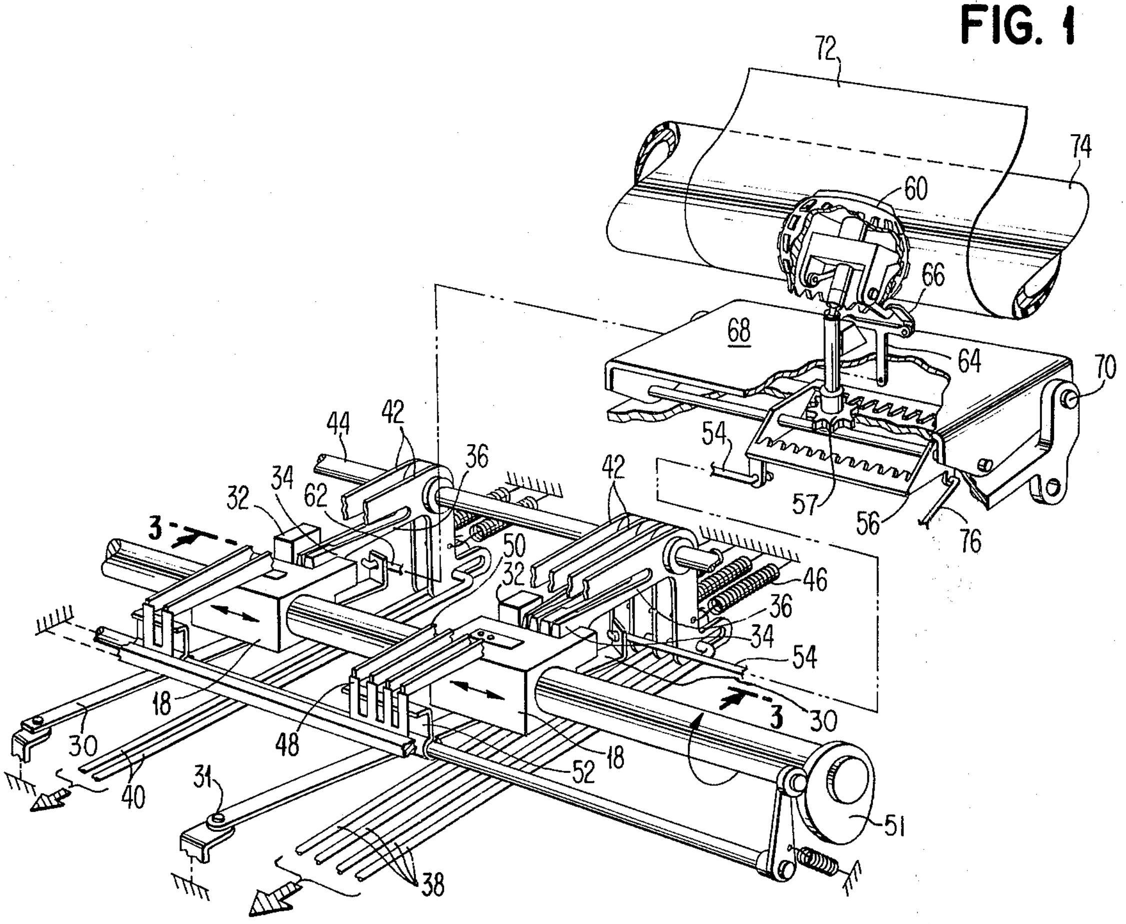
FIG. 1 illustrates the rotary to linear motion conversion device as implemented in its preferred embodiment in a typewriter selection mechanism for controlling the rotation or tilt of the single element typehead.

At another loction on follower 18, is pivotally attached a lever arm 30. Lever arm 30 acts to accomplish two functions. As can be seen in FIG. 1, lever arm 30 is grounded at a fulcrum point and thus becomes a displacement multiplier upon the movement of follower block 18.

Secondarily, follower block 18 is stabilized by lever 30 and is thus prevented from revolving with the rotation of shaft 10.

The rotation of shaft 10 in the direction indicated by the arrow, will cause the ball follower to rise along groove 12 to the high rise 16 thus translating follower block 18 in a leftward direction.

If at some point prior to reaching the high rise 16, stop surface 22 engages a non-displacable member, the force of the rotation of shaft 10 will then no longer be able to translate block 18 coaxial thereto. Thus, ball 28 will cam up out of the groove 12 due to the sloping side wall shape and will ride on the periphery of shaft 10. As shaft 10 continues to rotate, the reverse slope of groove 12 will be presented to the ball 28 and the ball 28 will drop back into the groove 12 and be urged generally rightward in FIG. 2 back to the low rise 14.

To provide for the control of the lateral coaxial translation of follower block 18, a fixed stop member is placed at a known distance from stop surface 22, corresponding to the maximum desired translation of follower block 18.

In order to vary the amount of translation of follower block 18 and stop surface 22, a series of series of varied width stop members 34 are placed between stop surface 22 and fixed stop 32.

Figure 3:
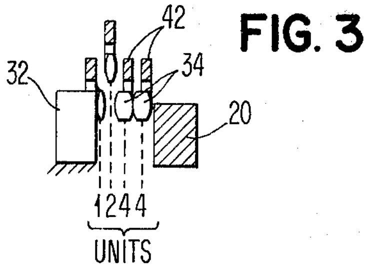
FIG. 3 illustrates the device for controlling the amount of lateral movement of the follower block.

Referring to FIG. 3, the width in units of displacement, is noted on the end of each interposer 34. For a mechanism which requires the ability to access twelve different columns of characters on a typehead within one case, four interposers of widths four units, four units, two units and one unit respectively may be used. In addition, a small gap the equivalent of one half unit in width is left between the interposers and stop surface 22 in its rest or home position. This allows the stop surface 22 and stop arm 20 to begin to translate slightly before engaging the interposers. The interposer blocks 34 are mounted on flexible arms 36. This allows the lateral movement of the block 34 to take up any unused space. Thus it can be seen from FIG. 3 that with the two units interposer withdrawn, there remain blocks 34 having a total of nine units in width. This total width of nine units prevents the stop surface 22 from engaging stop member 32 by a total of nine units of translation and therefore only allows a two and a half unit translation of stop surface 22. This translation is accomplished by the forcing of the four unit blocks 34 leftward to occupy displaced positions, the displacement corresponding to the two units of width which have been withdrawn. As can be seen by withdrawing a combination of the four members it is possible to provide a total of twelve different possible translatory positions for stop surface 22 when fully engaged and blocked from further translation. When the interposer 34 prevents stop arm 20 and stop surface 22 from translating further, follower ball 28 is then forced out of groove 12 and the translatory force exerted on ball 28 and follower member 26 is relieved and follower block 18 is no longer acted upon to cause additional displacement.

The normal position, after restoration of the follower to its home position, is midway between rows, thus requiring a one half unit rotate to align the first row of either case.

To control the displacement of a slider block 18, whether it be for rotate or tilt, interposers 42 are pivotally mounted on pivot rod 44. The selection of interposers 42 and their appropriate interposer stop blocks 34 mounted on resilient webs 36 may be selected by the pulling of rotate selection links 38 in one of several possible combinations. The pulling of a link 38 causes the rotation of an interposer 42 against the spring force of restore springs 46. The rotation of interposers 42 is retained by spring comb fingers 48 latching extensins 50 of interposer 42. The spring combs 48 may be biased away from interposer 42 and the extensions 50 to allow the interposers to restore under the force of restore spring 46. This biasing is effected by restore bail 52 which may be cam operated in timed relationship to the rotation of selection shaft 10 after character printing. The rotation of shaft 10 would be such that near the end of the rotation cyle, the high rise of a cam 51 could cause restore bail 52 to oscillate in a counterclockwise direction as viewed from the right in FIG. 1. This would allow the combs 48 to be removed from engagement with extensions 50 allowing the interposers to restore.

Referring to FIG. 3, the stop blocks of interposer 42 may be selectively removed from the zone between stop member 32 and stop surface 22. In order to vary the amount of displacement of stop surface 22 and the follower block 18, any combination of the stop blocks 34 may be extracted to create unoccupied space and allow the movement of stop surface 22. FIG. 3 is illustrative where eleven units of rotation are capable of being controlled in addition to a twelfth position of rotation or the zero position. As an example, to control the typehead such that a letter requiring seven units of rotation should be selected, the one, two and one of the four unit block 34 may be pulled out of engagement and as follower block 18 translates such that stop surface 22 moves leftward the remaining four unit block can be displaced leftward on its resilient web 36 as seen in FIG. 1. As the block is forced leftward, it will engage stop 32 through interposer stop blocks 34 and prevent stop surface 22 from translating to its fullest extent by four units. Upon restoration, the interposers for the entire eleven units may be dropped back into the area between stop surface 22 and stop member 32 by restore bail 52 and restore springs 46.

The selection of which of the keyboard selection links 38 and 40 are to be manipulated, thus controlling which of the interposers 42 are rocked about their axis 44, can be controlled from a mechanical keyboard of the type presently used in the IBM "Selectric" typewriter. The interposers of that typewriter carry on themselves lugs which engage selection bails. The movement of an interposer and a lug on the interposer against a bail causes the bail to move thereby providing a mechanical output or pulling motion. By coding each of the interposers with the appropriate number of rotate tabs and the appropriate number of tilt tabs, six inputs may be generated as a maximum. In such an arrangement there would be six selection bails, four for rotate and two for tilt. The selection bails would be assigned values of four, four, two and one for rotate and two and one for tilt. By using any or all of the bails on the depression of any particular keyboard key, it is clear that the selection of a character may be accomplished and the necessary inputs to the selection links 38 and 40 are accomplished. Other well known keyboard arrangements may be adopted to provide the selection link inputs. The keyboard is not illustrated as it is not part of the present invention.

As the slider block 18 or follower block 18 is urged leftward under the influence of groove 12 as previously described, stop lug 20 and stop surface 22 as illustrated in FIG. 2 engage those remaining stop blocks 34 still in the zone of engagement. As the slider block 18 translates leftward the multiplying lever 30 attached to the slider block and grounded at 31 tends to multiply the movement of block 18 such that the output of rotate link 54 is a multiple of the movement of slider block 18. The dimensions of the length of bar 30 are configured to yeild the desired multiplied ratio of movement.

Link 54 is physically attached to a switchable rack member 56 which is very similar to the rack disclosed in U.S. Pat. application Ser. No. 375,277, filed June 29, 1973, now U.S. Pat. No. 3,892,304 in the name of I. D. Shakib and commonly assigned herewith. This rack 56 may be switched to engage the alternate side or set of teeth to reverse the rotation of typehead 60 and thus cause a case shift. the switching of the rack for case shift purposes may be accomplished by any convenient means such as a mechanical link directly to the shift keylever or other simple device. It is not necessary to run it through a machine function cycle to accomplish shift.

The tilt of the type element 60 is controlled in the same manner as the rotate insofar as selection links 40, interposers 42, stop blocks 34, stop member 32 and follower block 18, are concerned. However, the only significant difference is that the tilt link 62 is connected to a bell crank 64 which in turn causes the tilting of the typehead 60. Bell crank 64 in turn pulls tilt link 66 and causes the typehead 60 to tilt it in a conventional manner.

The typehead rotate and tilt selection together with the support bracket (not shown) and rack 56 and pinion 57 are mounted upon a pivotable support member or rocker 68. This member may be pivoted upwardly about pivot point 70 to cause the impacting of typehead 60 onto the record sheet 72 and against platen 74. The causing of this tilting may be accomplished through a cammed relationship with shaft 10 thus impacting at a time when slider 18 has come to rest and prior to beginning its restoration.

While the invention has been particularly shown and described with reference to a preferred embodiment thereof, it will be understood by those skilled in the art that various changes in form and details may be made therein without departing from the spirit and scope of the invention.

I claim:

1. A rotary to linear motion convertor for converting a rotary motion to a predetermined selected displacement of linear motion comprising:

a rotatable shaft having a groove formed in the exterior periphery thereof, said groove being continuous and closed on itself and having a displacement from a plane perpendicular to the axis of rotation of said shaft such that the distance between a plane intersecting one axial extremity of said groove and points along the groove progressively increase and decrease to form said closed groove, follower means mounted for sliding movement coaxial with the axis of said rotating shaft and comprising, support means slidably engaging at least a portion of the rotating periphery of said shaft;

groove engaging means supported by said support means to engage said groove and create coaxial relative motion between said shaft and said follower means;

said support means further comprising at least one stop surface for engaging a displacement defining stop means;

and relief means supported by said support means and engageable with said groove engaging means to resiliently engage said groove engaging means and allow said groove engaging means to disengage said groove against said relief means when not permitted to translate and to urge said engaging means toward re-engagement with said groove;

stop means for engaging said stop surface, and for selectively determining displacement of said support means.

2. The device of claim 1 further comprising displacement multiplying means associated with said follower means to multiply said follower means displacement.

3. A rotary to linear motion convertor for converting a rotary motion to a predermined selected displacement of linear motion comprising:

a rotating shaft having a groove formed in the exterior periphery thereof, said groove being continuous and closed on itself and having a displacement from a plane perpendicular to the axis of rotation of said shaft such that the distance between a plane intersecting one axial extremity of said groove and points along the groove progressively increase and decrease to form said closed groove, follower means mounted for sliding movement coaxial with the axis of said rotating shaft and comprising, support means slidably engaging at least a portion of the rotating periphery of said shaft, groove engaging means supported by said support means and confined to movement in one axis with respect to said support means, said axis being substantially radial to said rotating shaft and being constrained from movement with respect to said support means in axes of other directions, said support means further comprising at least one stop surface for engaging a displacement defining stop means;

and relief means supported by said support member and engageable with said groove engaging means to resiliently engage said groove engaging means moves in its one axis of movement and to provide a restoring force to said groove engaging means in the direction of said one axis of movement;

stop means for engaging said stop surface to selectively limit displacement of said support member;

means associated with said support means to derive motion for output from said support means as it translates coaxially with said rotating shaft axis, said groove profile being formed to permit said groove engaging means to be forced in said one axis of movement against said restraining means when said stop surface engages said stop, thereby disengaging said engaging means and stopping the movement of said support means upon the engagement of said stop surface with said stop means.

4. A typewriter selection mechanism for converting the mechanical outputs of a keyboard to rotate and tilt movements for controlling a type element of a single element typewriter comprising:

a rotatable shaft having therein at least one closed groove in the periphery of said shaft, said groove formed to create a continuous closed on itself camming surface, a follower means resiliently engaging sad groove and translatable coaxially with the axis of rotation of said shaft in response to the rotation of said shaft, said follower means engageable with selectively movable stop members to restrict said axial translation of said follower means to a selected distance;

motion conversion means for convering a linear motion into a rotary motion to rotate said type element in response to a linear motion input;

said motion conversion means being connected to said follower means to derive said linear motion input from the movement of said follower means, said follower means responding to the rotation of said rotating shaft until said follower means solidly engages said selective stop members and is blocked from additional translational movement and disengages said follower means from said groove of said shaft until such groove of said shaft again presents itself at a later time during the rotational cycle of said shaft and urges said follower means in a return direction.

5. A typewriter selection mechanism for converting the mechanical outputs of a keyboard to rotate and tilt movements for controlling a type element of a single element typewriter comprising a rotatable shaft having therein at least one closed groove in the periphery of said shaft, said groove deviating from a plane perpendicular to the axis of said shaft and providing a progressively increasing and decreasing displacement from said plane, a follower means resiliently engaging said groove and translatable coaxially with the axis of rotation of said shaft in response to the rotation of said shaft, said follower means engageable with selectively movable stop members to restrict said axial translation of said follower means to a predetermined physical distance;

motion conversion means for converting a linear motion into a rotary motion to rotate said typehead in response to a linear motion input;

said motion conversion means being connected to said follower means to derive said linear motion input from the movement of said follower means, said follower means responding to the rotation of said rotating shaft until said follower means solidly engages said selective stop members and is blocked from additional translational movement and disengages said follower means from said groove until said groove again presents itself at a later time during the rotational cycle of said shaft and urges said follower means in a return direction.

* * * * *